UNITED STATES PATENT OFFICE.

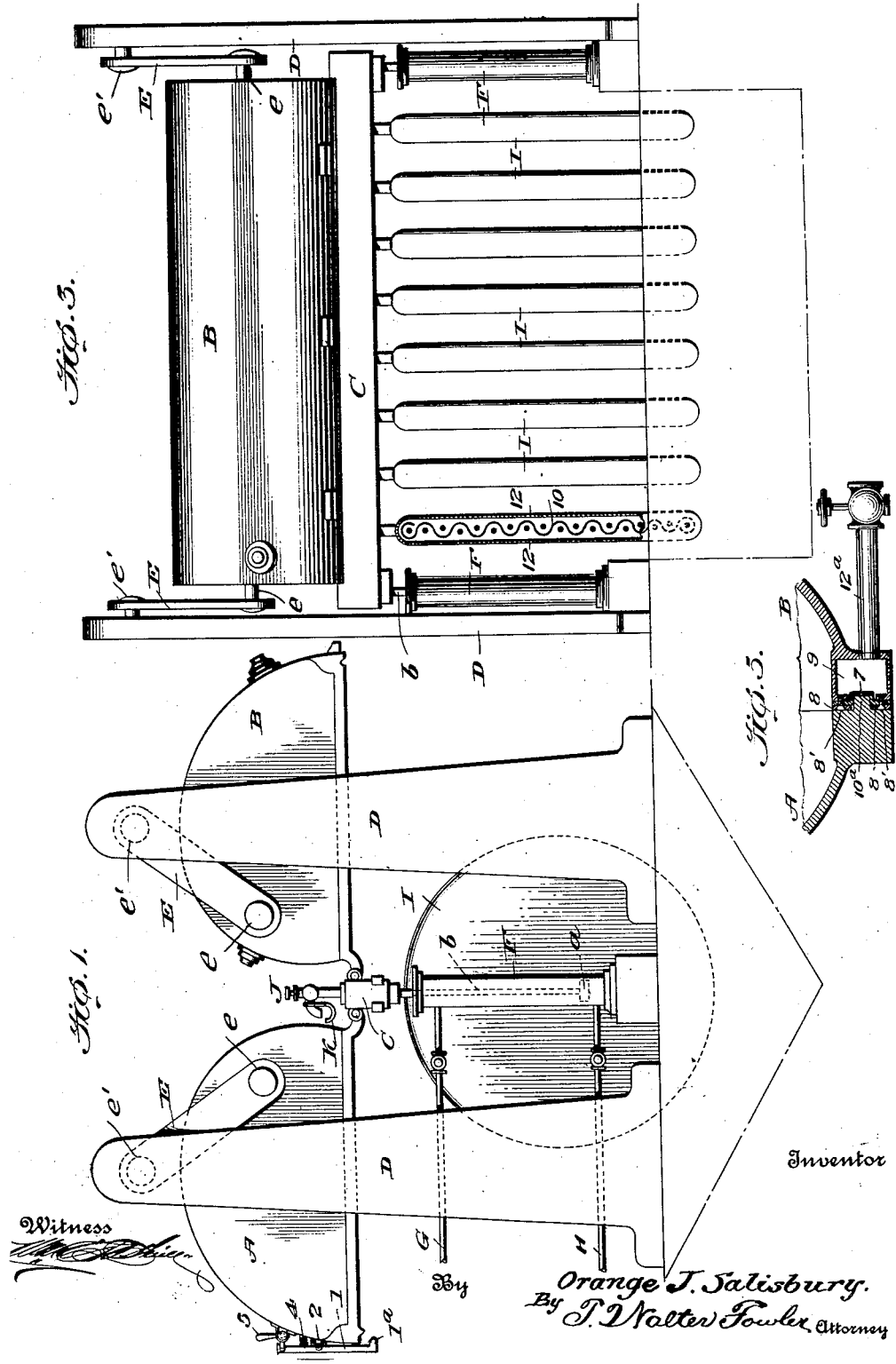

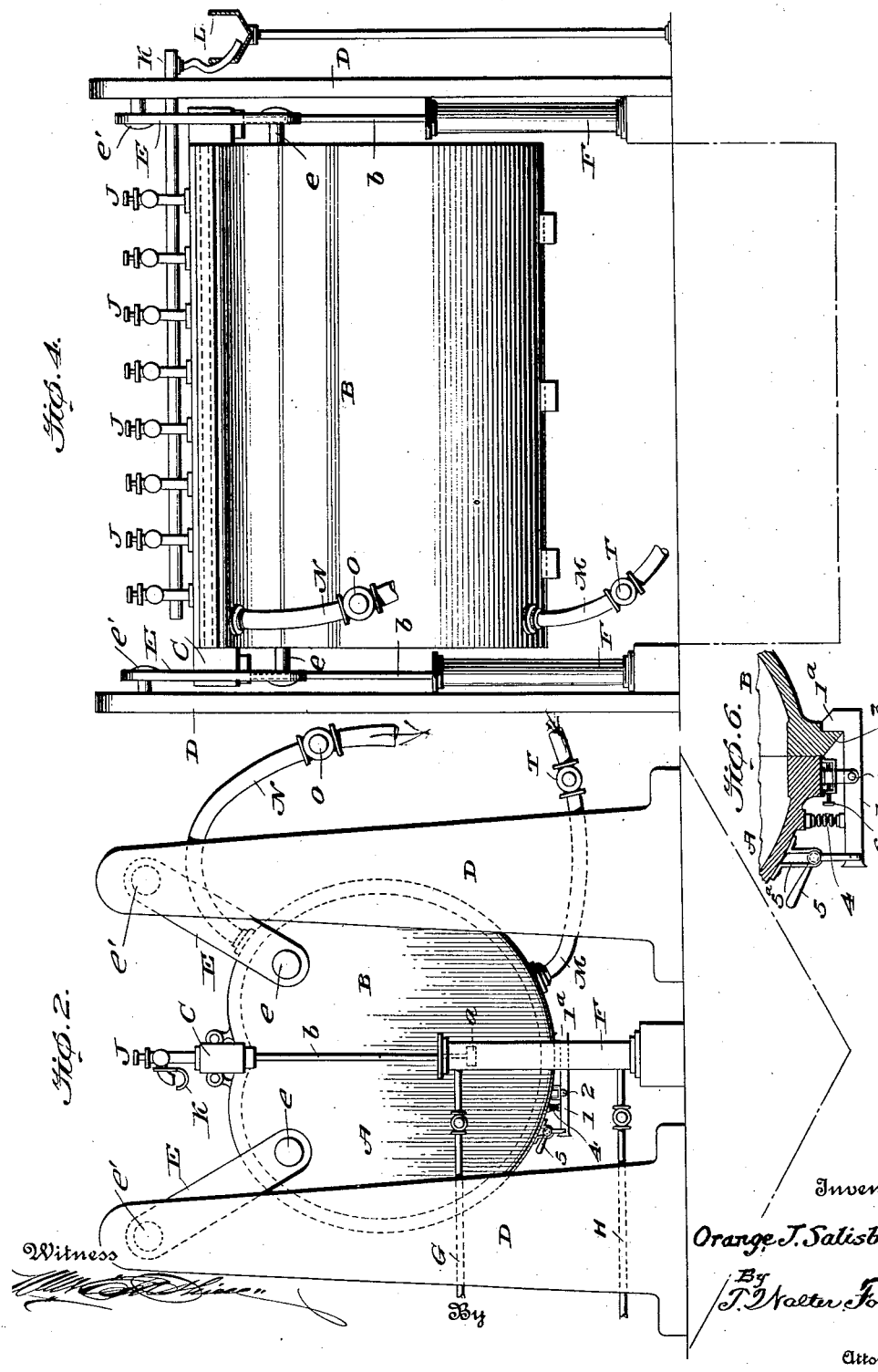

ORANGE JAMES SALISBURY, OF SALT LAKE CITY, UTAH.

FILTERING APPARATUS.

1,198,282. Specification of Letters Patent. Patented Sept. 12, 1916.

Application filed December 9, 1915. Serial No. 65,962.

*To all whom it may concern:*

Be it known that I, ORANGE J. SALISBURY, a citizen of the United States, residing at Salt Lake City, in the county of Salt Lake and State of Utah, have invented certain new and useful Improvements in Filtering Apparatus, of which the following is a specification.

My invention relates to an apparatus designed primarily to separate slimes from which precious metals have been dissolved and the liquid which holds the precious metals in solution. In the cyanid process, for example, when gold or silver bearing slimes are mixed or brought into contact with the cyanid solution, the precious metals are dissolved and carried in the liquid in a state of solution.

To effect a separation of the metal-bearing solution from the solid matter or slimes-tailings by means of an improved filtering apparatus is the essential object of the present invention.

While my invention has been found particularly useful for metallurgical work, it is not, however, limited to this use, since it may be successfully employed in other fields, and substantially wherever the separation of solids from liquid matter is desired. It will be understood, therefore, that the filtering apparatus which I am about to describe is capable of almost universal use and hence I may employ it in the filtration of mineral-bearing slimes and also in filtering saccharine solutions, chemicals, or wherever it is purposed to separate a liquid from a solid matter and to discharge the solid matter which has accumulated upon the outside of the filtering medium during the filtering process.

With the above and other objects in view my invention consists of the parts and the constructions, arrangements and combinations of parts substantially as I will hereinafter describe and claim.

In the accompanying drawing forming part of this specification and in which similar reference characters indicate like parts in the several views; Figure 1 is an end elevation of a filter-press or the like showing the casing sections open and a filtering element in position for discharging accumulated cake. Fig. 2 is a similar view showing the sections of the casing closed as when the filter is in operation. Fig. 3 is a side elevation of Fig. 1. Fig. 4 is a side elevation of Fig. 2. Fig. 5 is an enlarged sectional view of the joint formed between the abutting edges of the movable sections of the filter casing. Fig. 6 is a sectional detail of a locking mechanism for the abutting edges of the movable sections of the filter casing.

In a prior Patent Number 1,120,628, granted to me on the 28th day of December, 1914, I have described and claimed a filter-press wherein a filtering agent is contained within an inclosing shell or casing, which is formed of sections hingedly secured along one longitudinal edge or side, said sections being separable in unison in opposite directions and said sections opening to expose an interior filtering agent and closing to form a pressure chamber inclosing said filtering agent and within which chamber the filtering function occurs, and provision being afforded for the withdrawal of the liquid filtrate which percolates to the interior of the filtering agent, to a point outside of the shell or casing.

The present invention has particular reference to the type of apparatus disclosed in the aforesaid prior patent, and is an improvement thereon, and greatly simplifies the said prior patented construction, as I will now set forth.

Referring to Figs. 2 and 4, wherein the filter is shown in its closed or operative position, it will be observed that in the present instance, as in the prior patented construction, the filter casing comprises two similar metal sections, A—B, which may be of substantially semi-circular form hingedly secured along their upper longitudinal edges or sides and adapted to open outwardly and upwardly in opposite directions, as indicated in Fig. 1, and substantially as disclosed in the aforesaid patent.

In the present instance, I employ a supporting framework in the form of spaced uprights, D, rising from a foundation of any suitable character, there being a pair of these spaced uprights at each end of the casing and the end heads of said casing being connected to the upper portions of the uprights by toggle links, E, or other suitable connections, said links being connected to the heads at $e$ and to the uprights at $e'$, substantially as shown. Located between each pair of uprights is a fluid-pressure cylinder, F, which contains a piston, *a*, whose rod, *b*, extends through the upper end of the cylinder and is fixed to a head, or member, C, to opposite sides of which the upper inner edges of the sections, A—B, of the casing are pivoted or hingedly connected, thus operatively connecting one edge or side of the sections of the casing to the vertically movable head, C, and affording a means whereby said sections may be opened and closed with respect to the contained filtering leaf, or agent, I. It will be understood from the foregoing that the sections of the casing swing in unison with the vertical travel of the head, C, which, as before stated, is connected to the piston rod, *b*, so that in one movement of said piston, the sections of the casing are caused to swing about their hinged centers and to open upwardly and outwardly, and in the return movement of the piston the said sections are caused to swing downwardly and toward each other and to finally inclose the suspending filtering member. The vertical travel of the head, C, and of the piston to which it is connected through the medium of the piston rod may be accomplished by various means, any of which is within the scope of my present invention, but for present purposes, I have proposed the cylinders, F, and hydraulic or air-pressure which is admitted to the cylinders through suitable supply and exhaust pipes, G—H, respectively, as shown in Figs. 1 and 2.

The filtering member may be of any suitable character. It may be of the so-called "open-leaf" type, such as is common in the use of filter-presses, namely, where an interior woven wire or other reticulated plate, 10, is contained between suitable fabric or other filtering sides, 12, upon the interior of which the solid matter contained in the solution under treatment will deposit in the form of a filter cake, said filtering member having its interior adapted for the reception of the filtrate, which is delivered exteriorly of the press through individual outlet, J, as shown in Figs. 2 and 4, which outlets empty into a launder, K, shown in Figs. 2 and 4, from whence the filtrate is carried by a flexible connection into a trough, L, or other suitable receiver.

In the present instance, I prefer to suspend or support the filtering member, I, or a number of such members placed side by side, in the type of filter illustrated, from the movable head or member, C, before mentioned, so that the filtering member or members will partake of the vertical movement of said head and which movement is in unison with the opening and closing movements of the sections, A—B, of the filter casing. In other words, the arrangement shown, is such that there is a relative movement between the sections of the casing and the filtering member, as I will hereinafter explain.

By suspending the sections, A and B, of the casing substantially in the manner before described, and connecting the filtering member or leaf to the head or part to which the sections of the casing are themselves attached, it will be apparent that the sections, A and B, may be so balanced by reason of the toggle links, E, or like parts, that when the solid material in cake form has accumulated on the sides of the filtering member and the filter-press is ready for unlocking and for the discharge of this accumulated cake, that the weight of the cake tends to lower or drag down the filtering member and the head, C, to which the filtering member is connected, to thereby assist materially in causing the sections of the casing to swing about their pivotal connections, with the links, E, and thus open upwardly and outwardly until they assume a position substantially as indicated in Fig. 1. When the cake has been discharged, which operation may be accomplished by any method well known in this art, the sections of the casing have lost considerable weight and, therefore, the now superior weight of the sections, A and B, assists in lifting the filtering member or members and, thereby bringing the same into normal position, to be inclosed by said sections in the completion of their closing movement. Hence the amount of power required to operate such a filter as I have described, through the medium of fluid pressure cylinders and pistons is very small. Another advantage for the present construction is that the filtering members or member, are permitted to drop; in fact do drop down into a position when the filter-press is open and the sections are lifted, as in Fig. 1, so that the filtering members are entirely accessible from the outside. They are also nearer the floor and by placing the uprights, D, low down over a hopper, the filter cake or cakes may be readily discharged from the filtering member or members and into the hopper very conveniently and with a minimum amount of labor.

In order that the solution to be filtered may be admitted to the sectional tank or casing, I employ an inlet pipe or flexible feed connection, M, which has a controlling valve, T; and to provide for the discharge of air which may accumulate in the upper portion of the casing during the filling thereof, and as an overflow for solution, I employ a pipe, N, which leads from the upper portion of the casing and is provided with a controlling valve, O.

In the prior patented construction, before mentioned, I show one means of locking the free edges or sides of the swinging sections of the casing in a closed liquid-tight condition and in Figs. 5 and 6 of the present drawings, I illustrate in detail another and different form of locking mechanism. By reference to Fig. 6 it will be seen that this locking mechanism comprises a bar, 1, which at a point, 2, between its ends is pivotally connected, said bar having at one end a hook portion, 1ª, adapted to engage a lug, 3, on the bottom of one of the sections of the casing, and said bar, 1, being suspended from and carried by the other and coöperating section of said casing. The locking bar, 1, engages a coiled or other spring, 4, and has its free end provided or supplied with a lifting rod and handle, 5, suitably suspended or mounted in a slotted bracket or yoke or similar bearing, 5ª, fixed to and depending from the underside of one of the sections of the casing. An adjusting screw, 6, is shown in Fig. 5, as a means for taking up wear between the foregoing parts.

In practice, a series of the described locking bars, 1, is placed along the bottom and ends, if necessary, of all of the joints between the sections, A and B, of the shell or casing, in order to hold the parts in position against the interior pressure which exists during the filtering operation. To further insure a tight joint between the sections, A and B, of the casing, I have shown in Fig. 5, a new and special arrangement for the purpose and which comprises a flexible gasket, 7, composed of any suitable material, as rubber, leather, asbestos, &c., and which is securely held at either end by a plate, 8, and securing screw, 8', the gasket being thus held firmly along the edges to one section of the casing. This section, say B, of the casing, is cored out to form a chamber, 9, into which compressed air or fluid under pressure may be admitted thereto. The section, A, has the edge or side which opposes the gasket-carried side or portion of the opposing section, B, provided with a projecting rib or bead, 10ª, which, upon the sections of the casing being brought into their closed position, as in Fig. 2, engages and forces the flexible gasket inwardly, thereby compressing the gasket and causing it to cover the rib or bead so as to form a water-tight and air-tight joint between the interior of the casing and the outside atmosphere. In this improved type of liquid-proof joint, it is to be noted that a superior pressure may be admitted into the chamber, 9, to that which is exerted within the casing for filtration requirements. Hence there is no opportunity for a leak from the interior of the casing along the joints between the edges or abutting sides of the aforesaid shells, A and B, or between the shells and the movable head or member, C, of the actuating mechanism. In order that fluid pressure may be admitted to the chamber to effect the foregoing, I have shown in Fig. 5, a connection, 12ª, having an appropriate controlling valve, which is always to be opened before opening the filter proper in order that the compressed air or gas in the compartment, 9, may be exhausted before the filter press is opened.

To complete the foregoing description I will now give one complete cycle of operation of the improved press: Having reference to Fig. 2, where the sections of the filter casing are closed, and the press is ready for filtering functions, the valve, T, in the supply pipe, is opened, and the pulp or material to be filtered is introduced under pressure through said pipe. At the same time the valve, O, is opened for the purpose of relieving the air pressure in the upper portion of the casing and which air will be discharged through the pipe, M. When the casing is full of the pulp or material to be filtered and which will be made known by the overflow of material through the pipe, N, the valve, O, is closed and pressure being exerted from some outside source through the supply pipe, M, the solid material accumulates on the outside of the filter leaves, I, and the clear filtrate is driven through the filter medium and, finally, is delivered through the individual valves, J, and into the launder, K, and trough, L. The filtering operation is continued as long as may be desired and necessary in any particular case and until the cakes are accumulated upon the sides of the filter members, 1. Then if it is required to wash the cake, to obtain any retained values, for instance, the excess or unfiltered pulp or material may be drained out of the casing by a suitable connection through the pipe, M, at the same time allowing a little air to enter through the pipe, N, and valve, O, to prevent the formation of a vacuum in the casing. When the excess or unfiltered pulp or material is drawn out wash water may be introduced through the pipe, N, and valve, O, said valve remaining open until the casing is filled with the wash water, when said valve is closed. The water now permeates the cake, which has accumulated on the filter leaves or member and after passing to the interior of the same it is discharged through the individual valves, J, into the launder, K, and thence into any suitable trough for carrying off the wash water. When the cakes are washed, the water is withdrawn from the shell substantially as heretofore described for the withdrawing of the excess pulp. If it is wished to obtain a dry cake, the cakes may then be blown with compressed air or other gas by any well known and suitable connection through the valve, O, the valve, T, of pipe, M, in the meantime being closed. When the washing of the cake has been performed, or the washing and drying of said cakes, if desired, has been carried out to a desired degree, the filter is then ready for dumping and this may be accomplished by pressing down the controlling lever, 5, which results in lifting the outer end of the bar, 1, and compressing the spring, 4, and releasing the hook end of the bar, 1, from its engagement with the lug, 3. Air or fluid under pressure is now admitted through pipe, G, to the upper portion of the cylinders, F, above the pistons a, thereof with the result that the pistons are forced downward and through the rods, b, pull down on the heads, or members C, to which the rods are rigidly connected, and as the heads thus move down, the sections A and B, of the casing turn about their pivotal or suspension connections with the links, E, and thus swing outward and upward into the position shown in Fig. 1; the filter members, I, at the same time move downward so that they assume the position shown in said figure. The cakes are then discharged in the usual manner by either introducing compressed air or gas under pressure to the inside of the filter frames or members, as is usually done, or simply by washing off the cakes by means of water delivered through a hose, or by any other method well known in the art of filtration. When the cakes are dumped, pressure is admitted to the bottom of the cylinders, F, through the pipes, H, and the pistons are caused to move upwardly carrying with them the heads, C, and causing the sections, A and B, to swing about their points of suspension and to travel downwardly toward each other and to close together, and to be rigidly locked one to the other by the engagement of the lugs, 3, with the spring-pressed locking bars, 1, before mentioned, it being understood that in this closing function the inclined surface of the hook-end of each of the bars, 1, will slide upon the corresponding inclined surfaces of a lug, 3, until the outer edge of the lug is reached when the spring, 4, exerts its power upon the locking bar and causes the hook end of the bar to snap into closed engagement with the lug. Air, gas, or fluid under pressure, is then admitted into the chamber, 9, for completing or insuring a liquid-tight joint between the parts, when the filter is in position for further filtering operations, but before the shell or casing is opened, the air or fluid is exhausted from the chamber, 9, in any suitable manner.

Having thus described my invention what I claim as new and desire to secure by Letters Patent is:—

1. In a filter press, the combination with a filtering agent and an inclosing shell or casing formed of separable sections, of means for moving the filtering agent in unison with the opening and closing movements of said sections through the space between the separate sections.

2. In a filter press, the combination with a filtering agent and an inclosing shell or casing therefor formed of sections hingedly secured along one longitudinal side and separable in unison in substantially opposite directions, of means for moving the filtering agent in unison with the opening and closing movements of said sections through the space between the separated sections.

3. In a filter-press, the combination with a filtering agent and an inclosing shell or casing formed of a pair of similar sections pivotally suspended along their upper longitudinal sides and adapted to open in unison in opposite directions about their points of suspension, of means for lowering the filtering agent in unison with the opening movements of said sections.

4. In a filter-press, the combination with a filtering agent and an inclosing shell or casing formed of a pair of similar sections pivotally suspended along their upper longitudinal sides and adapted to close in unison from opposite directions, of connections with said sections for elevating the filtering agent toward said section in unison with closing movement of the latter.

5. In a filter-press, the combination with a filtering agent, of an inclosing shell or casing formed of a pair of similar sections pivotally suspended along their upper longitudinal sides, and adapted to open and close in unison in substantially opposite directions, and means for imparting motion to the filtering agent in unison with the movements of said sections in a plane substantially at right-angles to the plane of the pivotal axes of said sections.

6. In a filter-press, the combination of a shell or casing formed of sections pivotally hinged along their longitudinal sides, a fixed support and means pivotally suspending intermediate portions of the sections therefrom, a filtering agent inclosable in said sections, and means for opening the sections and simultaneously moving the filtering agent out of its normal filtering position.

7. A filter comprising a casing formed of sections which open and close in unison; a filtering agent inclosed by said sections; and means for imparting simultaneous movement to the sections and filtering agent in planes substantially at right-angles to each other.

8. A filter comprising a casing formed of sections which open and close in unison; a filtering agent inclosed by said sections; and means for imparting simultaneous movement to the sections and filtering agent in planes substantially at right-angles to each other, said means including a reciprocable member to which the sections and filtering agent are connected.

9. A filter comprising a casing formed of sections which open and close in unison; a filtering agent inclosed by said sections; and means for imparting simultaneous movement to the sections and filtering agent in planes substantially at right-angles to each other, said means including a reciprocable member to which the sections are hingedly connected and to which the filtering agent is rigidly attached.

10. In a filter, the combination with a stationary support, of a casing or shell formed of sections adapted to be opened and closed, said sections being pivotally suspended from said support at points between their hinged and free edges, means including a reciprocable member arranged between the points of pivotal suspension of the sections, said sections being hingedly connected to said member, and means for reciprocating said member to open the sections and simultaneously project the filtering agent and to close the sections and to simultaneously retract the filtering agent.

11. In a filter, the casing thereof formed of oppositely opening and closing sections and a filtering agent therebetween, said sections being pivotally suspended at points between their edges; and means including a reciprocable member arranged in a plane substantially midway between the points of suspension of said sections and to which member the sections and filtering agent are connected whereby in one movement of said member the sections open and the filtering agent is projected relatively thereto, and on the return movement of said member the filtering agent is restored to normal position and the sections closed thereabout.

12. A filter comprising a casing divided along its longitudinal center to form opposed co-acting sections, each of said sections being pivotally suspended at the ends between its center and upper edge, a movably mounted member to which corresponding edges of the sections are hingedly connected, and a filtering agent adapted to accumulate a filter cake on its outer surface and being pendent from the movably mounted member whereby the weight of the accumulated cake facilitates the opening movement of said sections.

13. A filter comprising a casing divided longitudinally to form similar and opposed sections; a horizontally disposed vertically movable member interposed between the upper edges of said sections and to which the sections are hingedly connected; a filtering means pendent from said member and upon which solids accumulate during the filtering operation; said sections being pivotally suspended at points above their horizontal center and removed from the upper edges thereof and adapted to be opened and closed in unison in opposite directions by the vertical movements of said member; and means for actuating said movable member.

14. A filter apparatus comprising a casing divided along substantially a vertical plane, the sections of said casing adapted to open and close in unison in substantially opposite directions; a filtering means within said casing and upon which solids accumulate during the filtering operation; a vertically movable connection between the upper opposed edges of said sections, said connection sustaining the filtering means whereby the weight of accumulated solids is utilized to assist the opening of the sections.

15. A filter apparatus comprising a casing divided along substantially a vertical plane, the sections of said casing adapted to open and close in unison in substantially opposite directions; a filtering means within said casing and upon which solids accumulate during the filtering operation; a vertically movable connection between the upper opposed edges of said sections, said connection sustaining the filtering means whereby the weight of accumulated solids is utilized to assist the opening of the sections, and releasable locking mechanism between the free portions of said sections.

16. A filter apparatus comprising a casing divided along substantially a vertical plane, the sections of said casing adapted to open and close in unison in substantially opposite directions; a filtering means within said casing and upon which solids accumulate during the filtering operation; a vertically movable connection between the upper opposed edges of said sections, said connection sustaining the filtering means whereby the weight of accumulated solids is utilized to assist the opening of the sections, releasable locking mechanism between the free portions of said sections; and fluid-pressure means for actuating the locking mechanism.

17. A filter apparatus comprising a casing divided along substantially a vertical plane, the sections of said casing adapted to open and close in unison in substantially opposite directions; a filtering means within said casing and upon which solids accumulate during the filtering operation; a vertically movable connection between the upper opposed edges of said sections, said connection sustaining the filtering means whereby the weight of accumulated solids is utilized to assist the opening of the sections, releasable locking mechanism between said sections; and a fluid pressure cylinder at each end of the vertically movable connection having a piston rod connected thereto.

18. A filter casing formed of sections of substantially semi-circular form in cross-section; a series of filtering members arranged within said casing; links connected to the ends of the sections at points above the centers thereof and removed a substantial distance from the upper edges of the sections; a pulling and pushing member between the upper edges of the sections fixedly secured to the filtering members and having the upper edges of the sections hingedly secured thereto whereby the sections are turned about their points of suspension and are opened and closed by the pull and push of said intermediate member, and the filtering elements are raised and lowered relatively to the sections; means for locking the sections together, and means for releasing the locking mechanism.

In testimony whereof I affix my signature.

ORANGE JAMES SALISBURY.